(12) United States Patent
Iwata et al.

(10) Patent No.: US 11,318,830 B2
(45) Date of Patent: May 3, 2022

(54) UTILITY VEHICLE

(71) Applicant: KAWASAKI JUKOGYO KABUSHIKI KAISHA, Kobe (JP)

(72) Inventors: Tetsuya Iwata, Kakogawa (JP); Shinichi Tanaka, Kobe (JP); Yoko Yasui, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 127 days.

(21) Appl. No.: 16/856,692

(22) Filed: Apr. 23, 2020

(65) Prior Publication Data
US 2021/0331580 A1    Oct. 28, 2021

(51) Int. Cl.
| | |
|---|---|
| *B60K 13/02* | (2006.01) |
| *F02M 35/024* | (2006.01) |
| *F02M 35/02* | (2006.01) |
| *B60K 1/00* | (2006.01) |
| *B60K 17/06* | (2006.01) |
| *B60K 5/00* | (2006.01) |
| *B60P 1/28* | (2006.01) |

(52) U.S. Cl.
CPC ......... *B60K 13/02* (2013.01); *F02M 35/0204* (2013.01); *F02M 35/024* (2013.01); *B60K 1/00* (2013.01); *B60K 5/00* (2013.01); *B60K 17/06* (2013.01); *B60P 1/28* (2013.01)

(58) Field of Classification Search
CPC . B60K 13/02; B60K 1/00; B60K 5/00; B60K 17/06; F02M 35/0204; F02M 35/024; B60P 1/28
See application file for complete search history.

(56) References Cited

U.S. PATENT DOCUMENTS

| | | | | |
|---|---|---|---|---|
| 5,086,858 | A * | 2/1992 | Mizuta | B60K 11/06 123/41.56 |
| 7,249,798 | B2 * | 7/2007 | Saito | B62D 33/0273 296/205 |
| RE42,086 | E * | 2/2011 | Saito | B62D 33/0273 296/205 |
| 8,827,019 | B2 * | 9/2014 | Deckard | F16H 57/027 180/68.1 |
| 9,512,809 | B2 * | 12/2016 | Tsumiyama | F02M 35/161 |
| 2012/0031693 | A1 * | 2/2012 | Deckard | B60K 17/06 180/68.3 |
| 2012/0031694 | A1 * | 2/2012 | Deckard | F16H 57/0416 180/68.3 |
| 2018/0326843 | A1 * | 11/2018 | Danielson | B60K 17/24 |

* cited by examiner

*Primary Examiner* — Bryan A Evans
(74) *Attorney, Agent, or Firm* — Alleman Hall Creasman & Tuttle LLP (57) ABSTRACT

A utility vehicle includes: a vehicle body frame including a cabin frame portion; a loading bed tiltable between a normal position and a dumping position; and an intake unit including an intake port. The intake unit is disposed above a rear wheel and extends over a height range overlapping a height range over which the loading bed in the normal position extends, and a location of the intake unit in a vehicle width direction substantially coincides with a location of a side wall portion of the loading bed in the vehicle width direction. The intake unit is located rearward of the cabin frame portion and exposed to the outside in the vehicle width direction. The intake unit is fixed to the vehicle body frame at a distance from a trajectory along which the loading bed is tilted.

17 Claims, 9 Drawing Sheets

UTILITY VEHICLE

FIELD OF THE INVENTION

The present disclosure relates to a utility vehicle configured to travel on uneven terrains.

DESCRIPTION OF THE RELATED ART

U.S. Pat. No. 9,512,809 discloses a utility vehicle configured to travel on uneven terrains. In a common utility vehicle, air present in an internal space enclosed by a vehicle body panel is drawn through an intake port and delivered as intake air to an engine. Air for cooing a continuously variable transmission is also drawn in a similar manner.

However, air may be stagnant in the internal space enclosed by the vehicle body panel, and may be contaminated with dirt or dust introduced due to intake pressure. Depending on the layout of the intake port, the occupant space may be narrowed by the presence of the intake port and intake duct. In a utility vehicle having a tiltable loading bed, depending on the layout of the intake port, the movement of the loading bed may be constrained, and the design flexibility of the intake passage may be reduced.

SUMMARY OF THE INVENTION

An object of the present disclosure is to obtain a sufficiently large occupant space, ensure intake of clean air, avoid constraints on the movement of a loading bed, and increase the design flexibility of an intake passage.

A utility vehicle according to one aspect of the present disclosure includes: a front wheel; a rear wheel; a vehicle body frame supported by the front wheel and the rear wheel, the vehicle body frame including a cabin frame portion defining an occupant space and a rear frame portion disposed rearward of the cabin frame portion; an engine supported by the vehicle body frame; a loading bed supported by the rear frame portion and tiltable between a normal position and a dumping position; and an intake unit including an intake port through which air to be supplied to the engine is drawn, wherein the intake unit is disposed above the rear wheel and extends over a height range overlapping a height range over which the loading bed in the normal position extends, a location of the intake unit in a vehicle width direction substantially coincides with a location of a side wall portion of the loading bed in the vehicle width direction, the intake unit is located rearward of the cabin frame portion and exposed to the outside in the vehicle width direction with the intake port facing outward in the vehicle width direction, and the intake unit is fixed to the vehicle body frame at a distance from a trajectory along which the loading bed is tilted.

In the above configuration, the intake unit is disposed such that the intake unit extends over a height range overlapping a height range over which the loading bed in the normal position extends and such that the location of the intake unit in the vehicle width direction substantially coincides with the location of the side wall portion of the loading bed in the vehicle width direction. Further, the intake unit is located rearward of the cabin frame portion and exposed to the outside in the vehicle width direction. As such, the occupant space can be sufficiently large, and at the same time clean air can be reliably drawn into the intake unit from air stream flowing along a lateral side of the vehicle during travel. Additionally, in the utility vehicle having the tiltable loading bed, since the intake unit located rearward of the cabin frame portion is fixed to the vehicle body frame at a distance from the trajectory along which the loading bed is tilted, constraints on the movement of the loading bed can be avoided, and at the same time the design flexibility of the intake passage can be increased.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments will be described with reference to the drawings.

Embodiment 1

Figure 1:
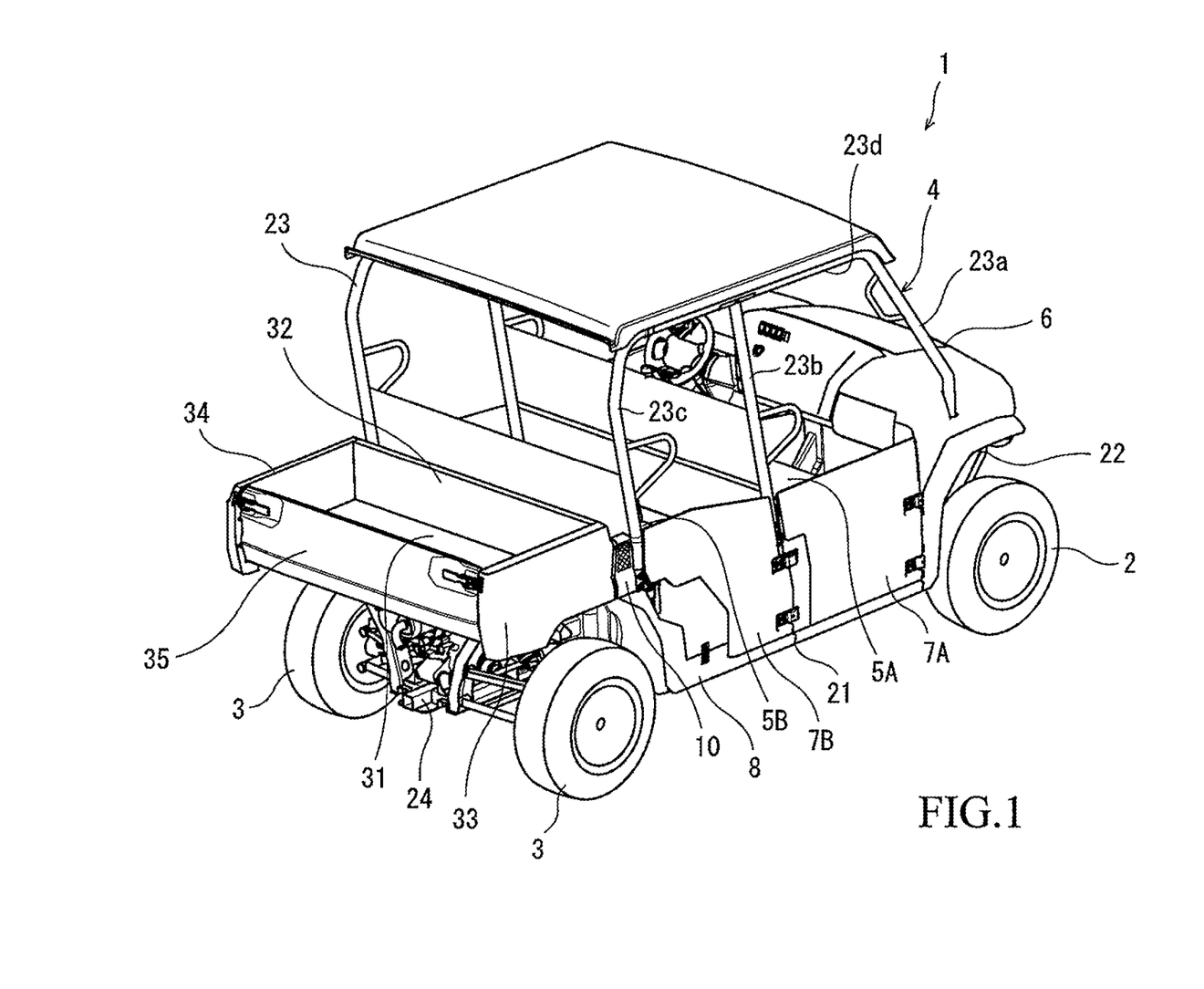
FIG. 1 is a right rear perspective view of a utility vehicle according to Embodiment 1.

FIG. 1 is a right rear perspective view of a utility vehicle 1 according to Embodiment 1. As shown in FIG. 1, the utility vehicle 1 includes a pair of left and right front wheels 2 and a pair of left and right rear wheels 3. The front and rear wheels 2 and 3 support a vehicle body frame 4. In the front and rear wheels 2 and 3, balloon tires are used. The vehicle body frame 4 is a pipe frame constituted by a plurality of pipes connected together.

The vehicle body frame 4 includes a base frame portion 21, a front frame portion 22, a cabin frame portion 23, and a rear frame portion 24. The base frame portion 21 supports a front row of seats 5A (driver seat and passenger seat) and a rear row of seats 5B. The occupant seats need not be arranged in two rows and may be arranged in a single row. The front frame portion 22 extends forward from the base frame portion 21 and supports the front wheels 2. The cabin frame portion 23 projects upward from the base frame portion 21 and is formed to surround the occupant space in which the front and rear seats 5A and 5B are disposed. The occupant space surrounded by the cabin frame portion 23 is exposed to the outside environment. The rear frame portion 24 extends rearward from the base frame portion 21 and is located rearward of the cabin frame portion.

The cabin frame portion 23 includes an A-pillar portion 23a, a B-pillar portion 23b, a C-pillar portion 23c, and a side roof member portion 23d. The A-pillar portion 23a, B-pillar portion 23b, and C-pillar portion 23c are arranged in this order from front to rear. The side roof member portion 23d extends in the front-rear direction from the upper end of the A-pillar portion 23a to the upper end of the C-pillar portion 23c, and the upper end of the B-pillar portion 23b is coupled to a middle portion of the side roof member portion 23d.

A hood 6 made of resin is disposed forward of the cabin frame portion 23. The hood 6 is supported by the front frame portion 22 and covers the space between the left and right front wheels 2 from above. The hood 6 can be opened to expose the space. Front side doors 7A and rear side doors 7B are disposed below the cabin frame portion 23. The front side door 7A is disposed between the A-pillar portion 23a and the B-pillar portion 23b to allow an occupant to get on and off any of the front seats 5A. The rear side door 7B is disposed between the B-pillar portion 23b and the C-pillar portion 23c to allow an occupant to get on and off any of the rear seats 5B. The rear side door 7B has a cut formed at its lower rear portion, and a side cover 8 is disposed to close the cut.

A loading bed 9 supported by the rear frame portion 24 is disposed rearward of the cabin frame portion 23. The loading bed 9 includes a bottom wall 31, a front wall 32, a right side wall 33, a left side wall 34, and a rear wall 35. The loading bed 9 is constructed as a combination of wall main bodies made of resin and frames made of metal. For example, the right side wall 33 includes a hollow side wall main body 33a and a pipe frame 33b reinforcing the side wall main body 33a. The right side wall 33 and left side wall 34 are asymmetrical in shape. Specifically, the front end of the right side wall 33 is located further rearward than the front end of the left side wall 34.

An engine E (see FIG. 4) supported by the vehicle body frame 4 is disposed below the loading bed 9. The engine E is an internal combustion engine that drives the front wheels 2 and/or rear wheels 3. An intake unit 10 is disposed behind the cabin frame portion 23 and ahead of the right side wall 33. The intake unit 10 draws air, which is to be supplied to the engine E, from the outside in the vehicle width direction. The location of the intake unit 10 in the vehicle width direction substantially coincides with the location of the right side wall 33 of the loading bed 9 in the vehicle width direction. The intake unit 10 may be disposed ahead of the left side wall 34 instead of being disposed ahead of the right side wall 33.

Figure 2:
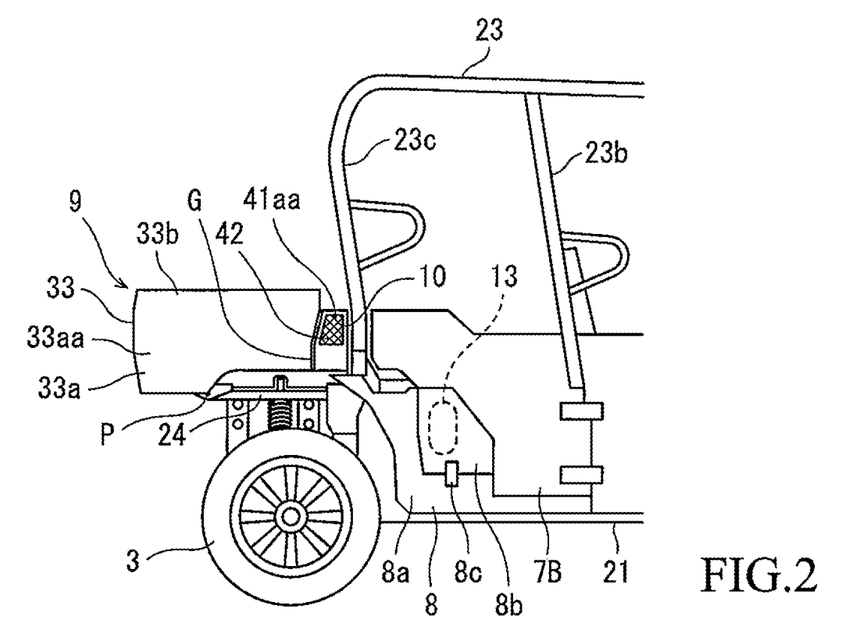
FIG. 2 is a right side view of the rear of the utility vehicle of FIG. 1 with its loading bed in a normal position.
Figure 3:
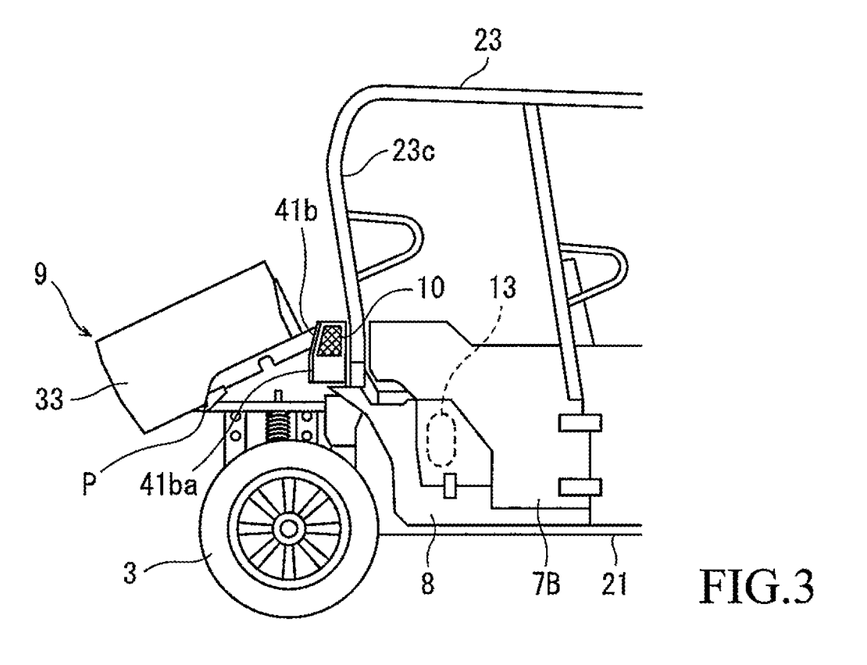
FIG. 3 is a right side view of the utility vehicle's rear of FIG. 2 with the loading bed in a dumping position.

FIG. 2 is a right side view of the rear of the utility vehicle 1 of FIG. 1 with its loading bed in a normal position. FIG. 3 is a right side view of the utility vehicle 1's rear of FIG. 2 with the loading bed in a dumping position. As shown in FIGS. 1 to 3, the loading bed 9 is configured to be tiltable between a normal position where the bottom wall 31 extends horizontally and a dumping position where the bottom wall 31 is inclined with respect to the horizontal. The loading bed 9 is tilted about a tilt pivot P relative to the rear frame portion 24 in such a manner that the front end of the loading bed 9 moves upward and rearward.

The intake unit 10 is disposed above the rear wheels 3 and extends over a height range overlapping a height range over which the loading bed 9 in the normal position extends. The intake unit 10 as viewed from the outside in the vehicle width direction is located within a height range between heights where the lower and upper ends of the loading bed 9 in the normal position are respectively located. The tilt pivot P of the loading bed 9 is located at a height equal to or less than a height where the lower end of the rear surface of the intake unit 10 is located. The intake unit 10 is at a distance from a trajectory along which the loading bed 9 is tilted.

The side cover 8 includes a cover main body 8a, a separable cover 8b, and a locking device 8c removably securing the separable cover 8b to the cover main body 8a. An air cleaner box 13, which will be described later, is disposed inwardly of the separable cover 8b in the vehicle width direction. Thus, when the locking device 8c is released and the separable cover 8b is removed from the cover main body 8a, the air cleaner box 13 is exposed to the outside in the vehicle width direction.

Figure 4:
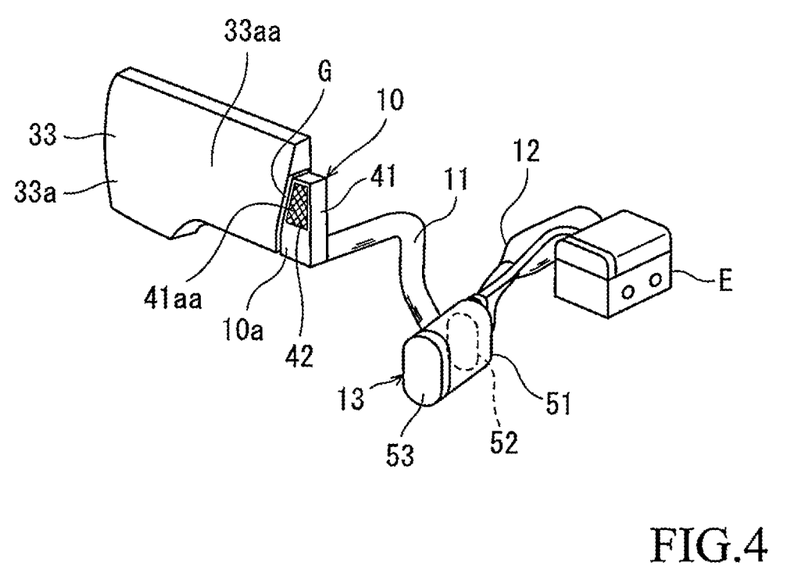
FIG. 4 is a right front perspective view of an intake system of the utility vehicle of FIG. 1.

FIG. 4 is a right front perspective view of an intake system of the utility vehicle 1 of FIG. 1. As shown in FIG. 4, the intake unit 10 is connected to the air cleaner box 13 via a first intake duct 11. The air cleaner box 13 is connected to an intake port of the engine E via a second intake duct 12. Thus, the air cleaner box 13 is disposed in the intake passage extending from the intake unit 10 to the engine E (air supply destination). The intake unit 10 draws air from the outside in the vehicle width direction under the action of negative pressure generated at the intake port of the engine E. The drawn air is delivered from the intake unit 10 to the air cleaner box 13 through the first intake duct 11. The air purified by the air cleaner box 13 is delivered to the intake port of the engine E through the second intake duct 12.

The air cleaner box 13 includes an accommodation case 51, an air cleaner element 52, and a lid 53. The accommodation case 51 has an opening 51a facing outward in the vehicle width direction. The air cleaner element 52 is a filter for purification of air. The air cleaner element 52 is replaceably mounted inside the accommodation case 51. The lid 53 is removably attached to the accommodation case 51 from the outside in the vehicle width direction so as to close the opening 51a of the accommodation case 51. Thus, the user can, after releasing the locking device 8c of the side cover 8 and removing the separable cover 8b, remove the lid 53 of the air cleaner box 13 and then take out the air cleaner element 52 from the air cleaner box 13. That is, the user can perform a maintenance operation on the air cleaner box 13 by accessing it from the outside in the vehicle width direction.

The air cleaner box 13 is located in the vicinity of and below the intake unit 10. The intake unit 10 and the air cleaner box 13 are disposed on the same side of the vehicle 1 in the vehicle width direction and are accessible from the same side (e.g., the right side) of the vehicle 1. The distance between the intake unit 10 and the air cleaner box 13 in the front-rear direction is less than 1 m, preferably less than 0.7 m, and more preferably less than 0.5 m.

The intake unit 10 has an outer side surface 10a facing outward in the vehicle width direction, and the outer side surface 10a is substantially flush with an outer side surface of the loading bed 9 in the normal position. In the present embodiment, the outer side surface 10a of the intake unit 10 is substantially flush with an outer side surface 33aa of the side wall main body 33a of the right side wall 33 of the loading bed 9. The color of the outer side surface 10a of the intake unit 10 is preferably the same as the color of the outer side surface 33aa of the loading bed 9.

Figure 5:
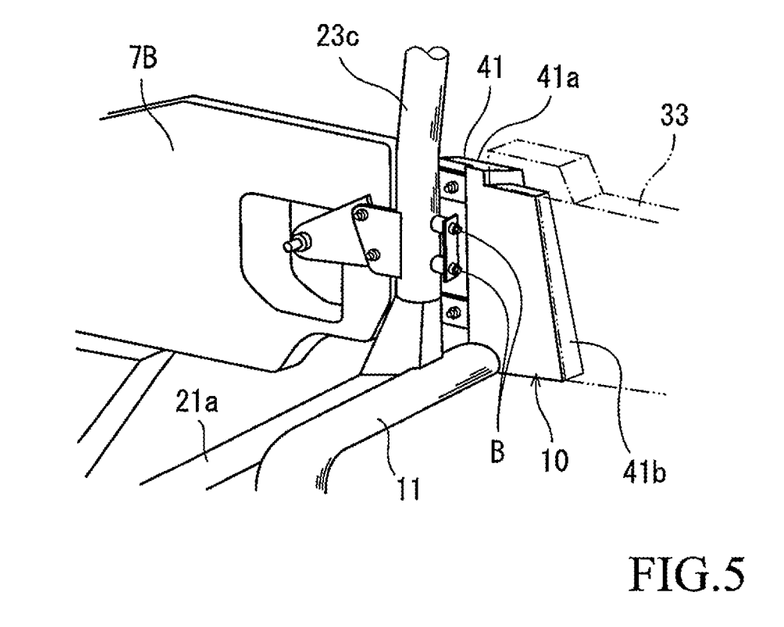
FIG. 5 is a perspective view showing a fixing structure of the intake unit of FIG. 2 as viewed from the inside in the vehicle width direction.

FIG. 5 is a perspective view showing a fixing structure of the intake unit 10 of FIG. 2 as viewed from the inside in the vehicle width direction. The intake unit 10 is disposed along the rear surface of the cabin frame portion 23. The intake unit 10 is fastened to the rear side of the C-pillar portion 23c of the cabin frame portion 23 by fastening members B (e.g., bolts). The fastening members B are exposed to the inside in the vehicle width direction and is hidden by the intake unit 10 to be invisible from the outside in the vehicle width direction. The intake unit 10 may be fixed to a cross member portion 21a of the base frame portion 21 instead of being fixed to the cabin frame portion 23.

Figure 6:
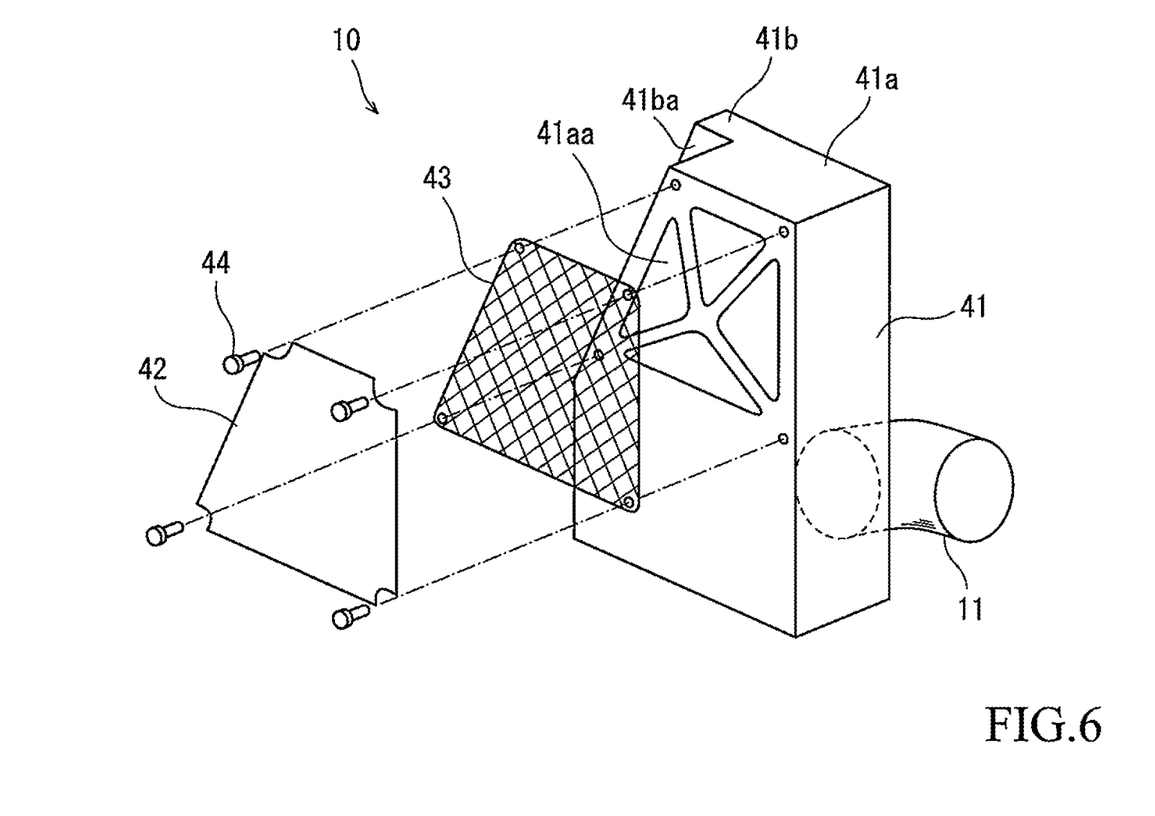
FIG. 6 is an exploded perspective view of the intake unit of FIG. 2.

FIG. 6 is an exploded perspective view of the intake unit 10 of FIG. 2. The intake unit 10 includes a unit main body 41, a prefilter 42, an adapter 43, and fastening members 44. The unit main body 41 is in the form of a box. The unit main body 41 may be in a form other than the form of a box and may be, for example, in the form of a duct. The unit main body 41 includes a box portion 41a and a projecting wall portion 41b. The box portion 41a is provided with an intake port 41aa facing outward in the vehicle width direction. The projecting wall portion 41b projects rearward from a portion of the rear surface of the box portion 41a, the portion being an inner portion in the vehicle width direction.

The prefilter 42 is bonded to the adapter 43 which is made of resin in the form of a mesh. The adapter 43 with the prefilter 42 bonded thereto is fixed to the unit main body 41 by the fastening members 44 (e.g., resin rivets). Thus, the prefilter 42 is attached to the outer side surface of the unit main body 41 from the outside in the vehicle width direction and covers the intake port 41aa of the unit main body 41. The user can remove the prefilter 42 together with the adapter 43 by removing the fastening members 44 and can perform a maintenance operation on the intake unit 10 by accessing it from the outside in the vehicle width direction.

As shown in FIGS. 2 and 4, the intake unit 10 as viewed from the outside in the vehicle width direction is disposed such that a gap G is formed between the intake unit 10 and the outer side surface 33aa of the right side wall 33 of the loading bed 9 in the normal position. As shown in FIGS. 3 and 5, the projecting wall portion 41b of the intake unit 10 is located inwardly of, and overlaps, the right side wall 33 of the loading bed 9 in the vehicle width direction. That surface of the projecting wall portion 41b of the intake unit 10 which faces outward in the vehicle width direction is a hiding surface 41ba. Thus, the hiding surface 41ba of the projecting wall portion 41b of the intake unit 10, as viewed from the outside in the vehicle width direction, covers the gap G from the inside in the vehicle width direction.

In the configuration described above, the intake unit 10 is disposed such that the intake unit 10 extends over a height range overlapping a height range over which the loading bed 9 in the normal position extends and such that the location of the intake unit 10 in the vehicle width direction substantially coincides with the location of the right side wall 33 of the loading bed 9 in the vehicle width direction. Further, the intake unit 10 is located rearward of the cabin frame portion 23 and exposed to the outside in the vehicle width direction. As such, the occupant space surrounded by the cabin frame portion 23 can be sufficiently large, and at the same time clean air can be reliably drawn into the intake unit 10 from air stream flowing along a lateral side of the vehicle 1 during travel. Additionally, in the utility vehicle 1 having the tiltable loading bed 9, since the intake unit 10 located rearward of the cabin frame portion 23 is fixed to the vehicle body frame 4 at a distance from the trajectory along which the loading bed 9 is tilted, constraints on the movement of the loading bed 9 can be avoided, and at the same time the design flexibility of the intake passage can be increased.

Additionally, since the outer side surface 10a of the intake unit 10, which faces outward in the vehicle width direction, is substantially flush with the outer side surface 33aa of the loading bed 9 in the normal position, air stream flowing along the outer side surface of the vehicle 1 during travel can be prevented from generating noise between the outer side surface of the loading bed 9 and the outer side surface 10a of the intake unit 10, and at the same time a good appearance of the vehicle 1 can be ensured. Additionally, since the intake unit 10 is disposed along the rear surface of the cabin frame portion 23, the intake unit 10 can be protected by the cabin frame portion 23.

Additionally, since the tilt pivot P of the loading bed 9 is located at a height equal to or less than a height where the lower end of the rear surface of the intake unit 10 is located, interference of the intake unit 10 with the tilt trajectory of the loading bed 9 can easily be avoided. Additionally, since the intake unit 10 as viewed from the outside in the vehicle width direction is located within a height range between heights where the lower and upper ends of the loading bed 9 in the normal position are respectively located, an increase in overall size of the vehicle 1 can be prevented, and at the same time the loading space of the loading bed 9 can be sufficiently large.

Additionally, since the gap G is formed between the loading bed 9 in the normal position and the intake unit 10, interference of the intake unit 10 with the loading bed 9 can be prevented even when a dimensional error occurs. Additionally, since the intake unit 10 has the hiding surface 41ba covering the gap G from the inside in the vehicle width direction, a good appearance of the vehicle as viewed from the outside in the vehicle width direction can be ensured.

Additionally, since the intake unit 10 and the air cleaner box 13 are disposed close to each other, the intake passage can be simplified, and maintenance operations can easily be performed on both the intake unit 10 and the air cleaner box 13. Additionally, since the prefilter 42 is removably attached to the unit main body 41 from the outside in the vehicle width direction and the lid 53 is removably attached to the accommodation case 51 from the outside in the vehicle width direction, maintenance operations can be performed on the prefilter 42 and the air cleaner element 52 by access from the same side.

Figure 7A:
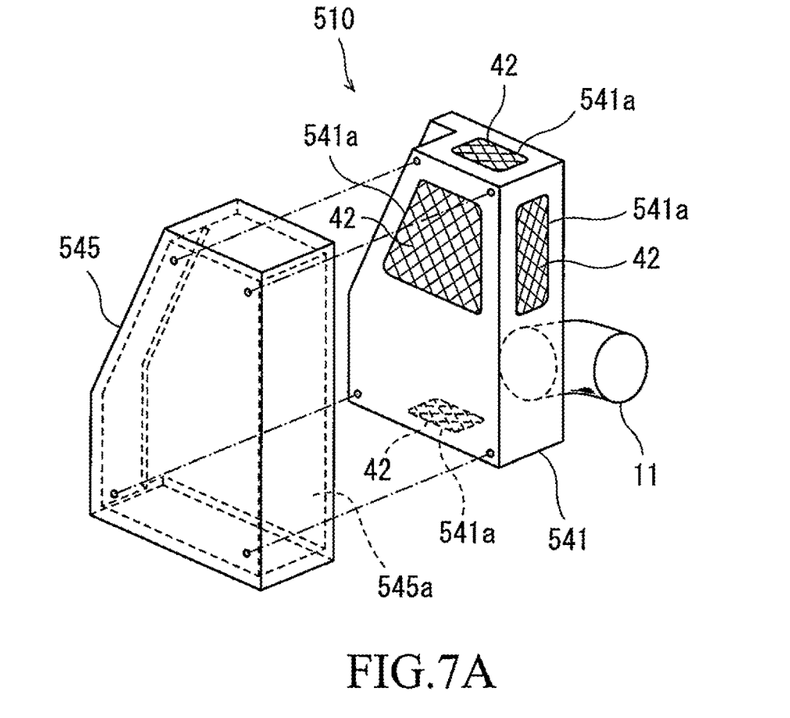
FIG. 7A is an exploded front perspective view of an intake unit of Modified Example 1 as viewed from the outside in the vehicle width direction.
Figure 7B:
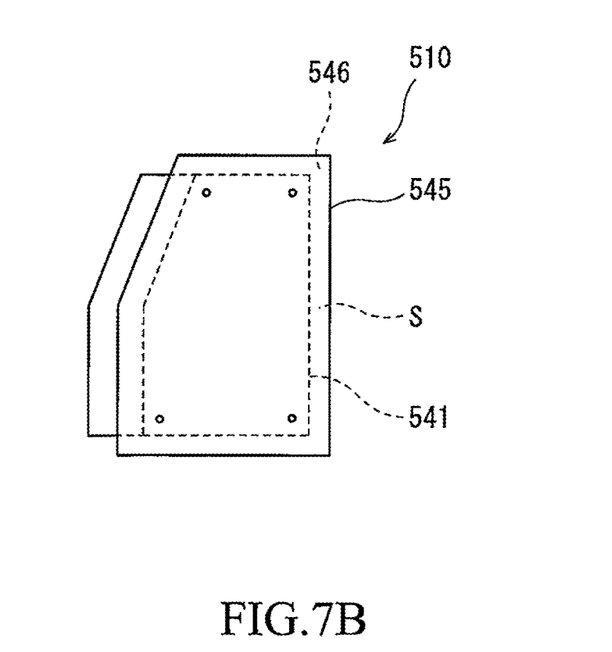
FIG. 7B is a side view of the intake unit of FIG. 7A as viewed from the outside in the vehicle width direction.

FIG. 7A is an exploded front perspective view of an intake unit 510 of Modified Example 1 as viewed from the outside in the vehicle width direction. FIG. 7B is a side view of the intake unit 510 of FIG. 7A as viewed from the outside in the vehicle width direction. As shown in FIGS. 7A and 7B, the intake unit 510 includes a unit main body 541 and a cover 545. The shape of the unit main body 541 is approximately the same as that of the unit main body 41 previously described. An inlet port 541a and the prefilter 42 covering the inlet port 541a may be provided on any surface of the unit main body 541. The inlet port 541a may consist of a single port or a plurality of ports. The cover 545 has a shape approximately similar to that of the unit main body 541 and is larger than the unit main body 541. The cover 545 has an opening 545a facing inward in the vehicle width direction (facing the unit main body 541). The cover 545 is fitted over and fixed to the unit main body 541 from the outside in the vehicle width direction. The outer surface of the cover 545 of the intake unit 510 in the vehicle width direction is exposed to the outside in the vehicle width direction.

With the cover 545 mounted on the unit main body 541, a gap S is formed between the inner surface of the cover 545 and the outer surface of the unit main body 541. That is, the inlet port 541a faces the inner surface of the cover 545 and is covered by the cover 545 with the gap S therebetween. The gap S has an opening facing inward in the vehicle width direction. The opening of the gap S, which faces inward in the vehicle width direction, functions as an intake port 546 of the intake unit 510. Thus, the intake port 546 of the intake unit 510 faces in a direction different from a direction toward the outside in the vehicle width direction. Also with this configuration, the occupant space can be sufficiently large, and at the same time clean air can be readily drawn into the intake unit 510.

Figure 8A:
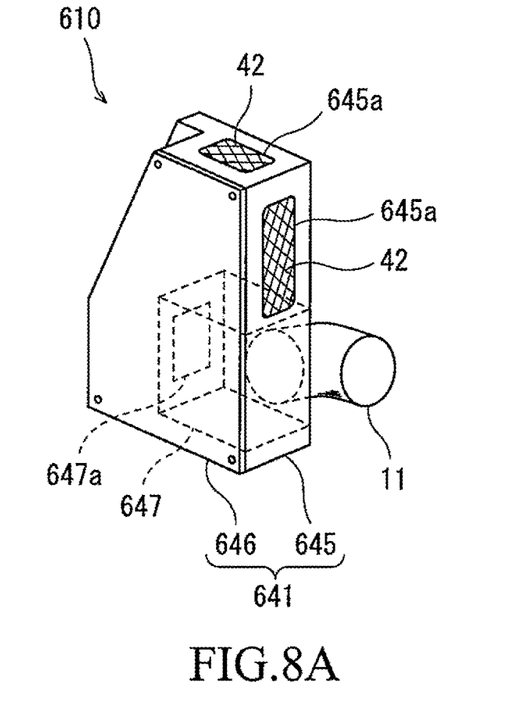
FIG. 8A is a front perspective view of an intake unit of Modified Example 2 as viewed from the outside in the vehicle width direction.
Figure 8B:
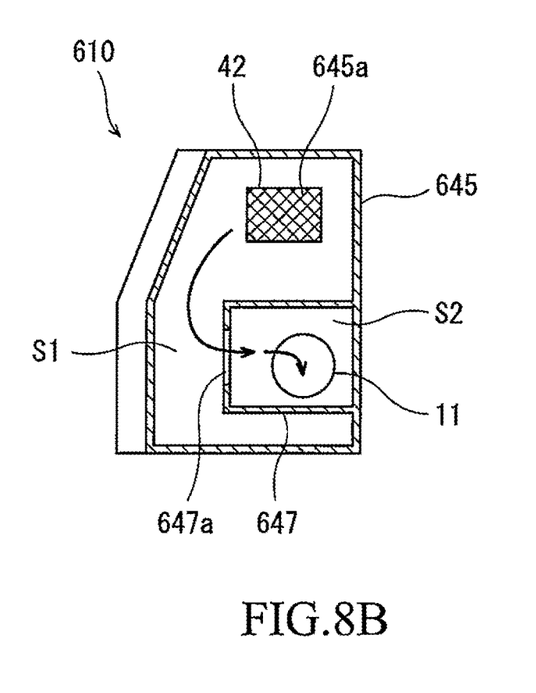
FIG. 8B is a longitudinal cross-sectional view of the intake unit of FIG. 8A as viewed from the outside in the vehicle width direction.

FIG. 8A is a front perspective view of an intake unit 610 of Modified Example 2 as viewed from the outside in the vehicle width direction. FIG. 8B is a longitudinal cross-sectional view of the intake unit 610 of FIG. 8A as viewed from the outside in the vehicle width direction. As shown in FIGS. 8A and 8B, the intake unit 610 includes a unit main body 645 and a lid 646. The unit main body 645 has an opening facing outward in the vehicle width direction, and the opening is closed by the lid 646. The unit main body 645 has an internal space, in which a partition 647 is disposed. The internal space of the unit main body 645 is divided by the partition 647 into a first space 51 and a second space S2. The partition 647 is provided with a communication hole 647a through which the first space 51 communicates with the second space S2.

An intake port 645a and the prefilter 42 covering the intake port 645 may be provided on any surface of the unit main body 645. The lid 646 is provided with no intake port. Thus, the intake port 645a faces in a direction different from a direction toward the outside in the vehicle width direction. The intake port 645a may consist of a single port or a plurality of ports. The intake port 645a opens to the first space 51. The first intake duct 11 opens to the second space S2. Air drawn through the intake port 645a is delivered to the first intake duct 11 through the first space 51, the communication hole 647a, and the second space S2. Also with this configuration, the occupant space can be sufficiently large, and at the same time clean air can be readily drawn into the intake unit 610.

The intake units of Modified Examples 1 and 2 described above are applicable also to other embodiments described below.

Embodiment 2

Figure 9:
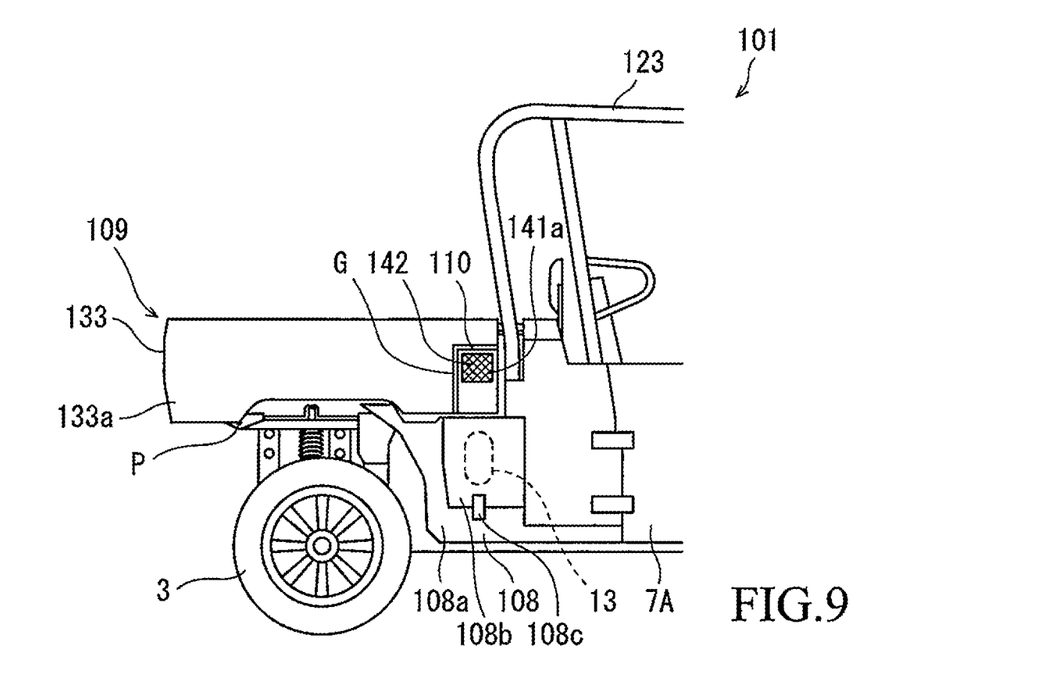
FIG. 9 is a right side view of the rear of a utility vehicle according to Embodiment 2 with its loading bed in the normal position.
Figure 10:
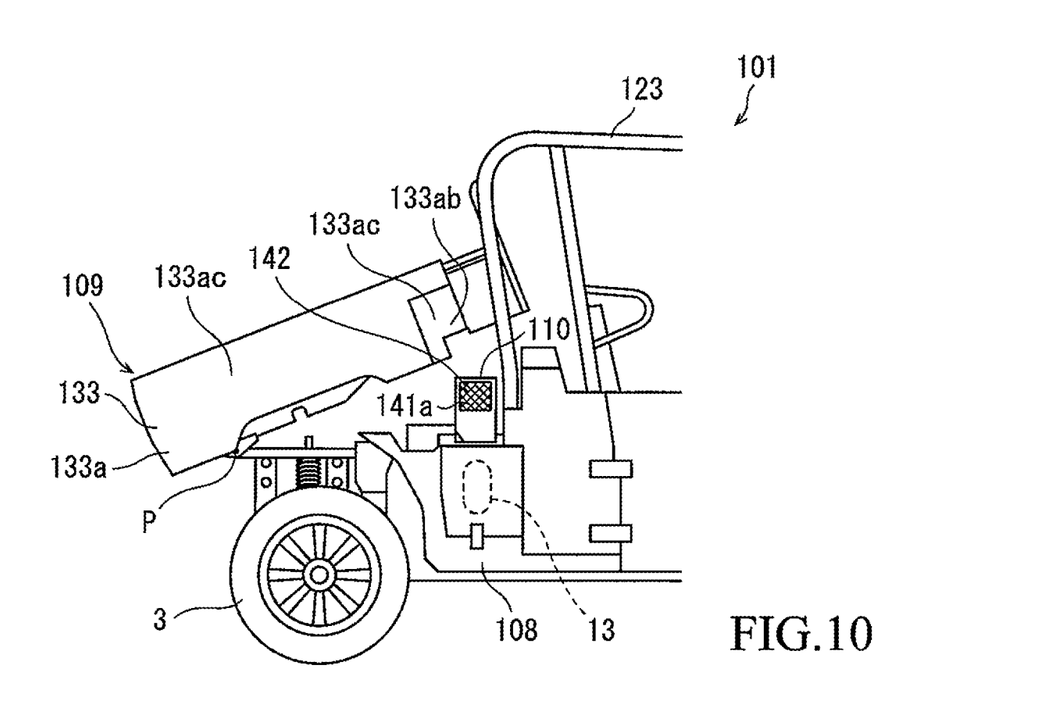
FIG. 10 is a right side view of the utility vehicle's rear of FIG. 9 with the loading bed in the dumping position.

FIG. 9 is a right side view of the rear of a utility vehicle 101 according to Embodiment 2 with its loading bed in the normal position. FIG. 10 is a right side view of the utility vehicle 101's rear of FIG. 9 with the loading bed in the dumping position. Elements identical to those of Embodiment 1 are denoted by the same reference signs and will not be described again. As shown in FIGS. 9 and 10, the utility vehicle 101 includes a single row of occupant seats disposed in an occupant space surrounded by a cabin frame portion 123. An intake unit 110 is disposed rearward of, and fixed to, the cabin frame portion 123. The intake unit 110 is located forward of the center of a loading bed 109 in the front-rear direction and rearward of the front end of the loading bed 109.

The intake unit 110 extends over a height range overlapping a height range over which the loading bed 109 in the normal position extends, and the location of the intake unit 110 in the vehicle width direction substantially coincides with the location of a right side wall 133 of the loading bed 109 in the vehicle width direction. The intake unit 110 located rearward of the cabin frame portion 123 is exposed to the outside in the vehicle width direction at a distance from a trajectory along which the loading bed 109 is tilted. The intake unit 110 includes a unit main body 141, and the unit main body 141 is not provided with any element corresponding to the projecting wall portion 41b of Embodiment 1. The unit main body 141 has an intake port 141a facing outward in the vehicle width direction and covered by a prefilter 142.

The right side wall 133 of the loading bed 109 includes a side wall main body 133a, and the side wall main body 133a includes an outer side surface 133aa and a recessed portion 133ab formed in the shape of a step by recessing the outer side surface 133aa inwardly in the vehicle width direction. This recessed portion 133ab is at a location corresponding to the location of the intake unit 110. The recessed portion 133ab is open forward and downward. The intake unit 110 as viewed from the outside in the vehicle width direction is disposed such that the gap G is formed between the intake unit 110 and the periphery of the recessed portion 133ab of the loading bed 109 in the normal position. That surface of the recessed portion 133ab of the loading bed 109 which faces outward in the vehicle width direction is a hiding surface 133ac covering the gap G from the inside in the vehicle width direction.

A side cover 108 is disposed rearward of the cabin frame portion 123, forward of the rear wheels 3, and below the loading bed 109. The air cleaner box 13 is disposed inwardly of a separable cover 108b of the side cover 108 in the vehicle width direction. When a locking device 108c is released and the separable cover 108b is removed from a cover main body 108a, the air cleaner box 13 is exposed to the outside in the vehicle width direction. In the present embodiment, the air cleaner box 13 is located rearward of the cabin frame portion 123, forward of the rear wheels 3, and directly below the intake unit 110.

In the above configuration, the occupant space surrounded by the cabin frame portion 123 can be sufficiently large, and at the same time clean air can be reliably drawn through the intake port 141a of the intake unit 110 from air stream flowing along a lateral side of the vehicle 101 during travel. Further, constraints on the movement of the loading bed 109 can be avoided, and at the same time the design flexibility of the intake passage can be increased. The other elements are the same as those of Embodiment 1 previously described and will therefore not be described again.

Embodiment 3

Figure 11:
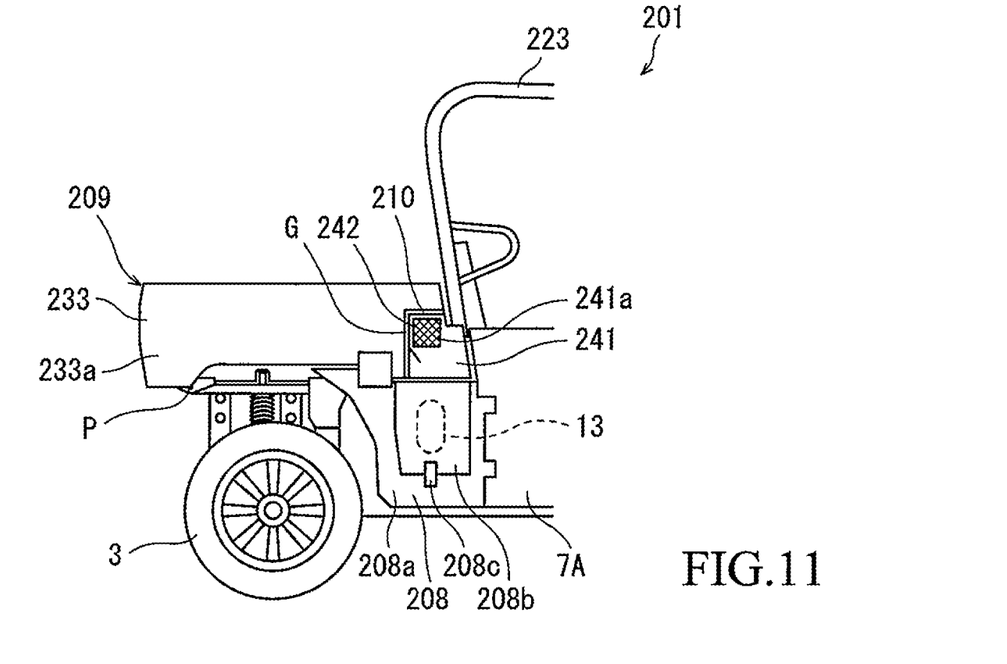
FIG. 11 is a right side view of the rear of a utility vehicle according to Embodiment 3 with its loading bed in the normal position.
Figure 12:
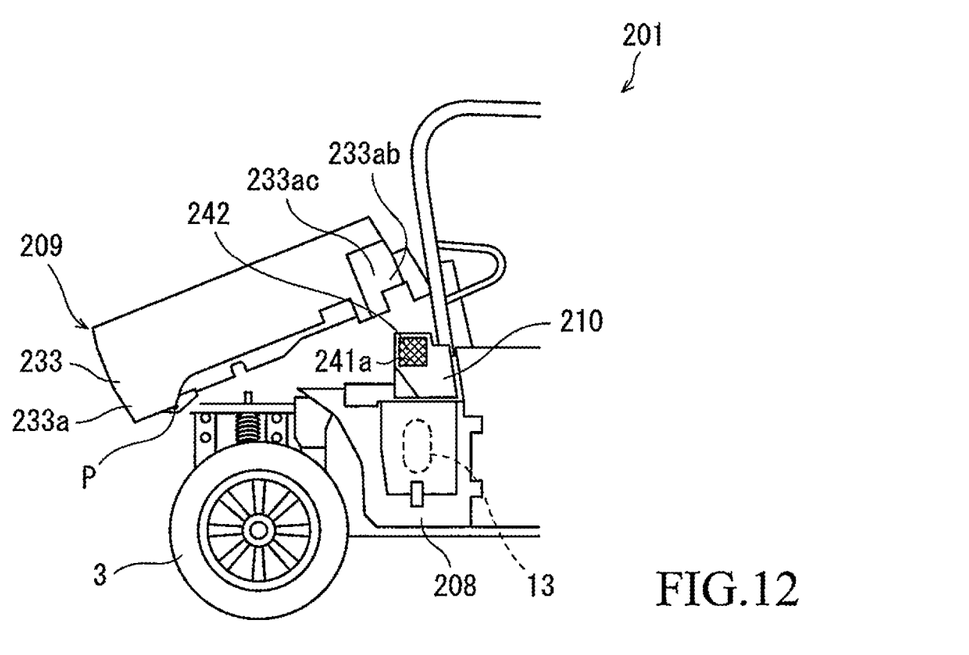
FIG. 12 is a right side view of the utility vehicle's rear of FIG. 11 with the loading bed in the dumping position.

FIG. 11 is a right side view of the rear of a utility vehicle 201 according to Embodiment 3 with its loading bed in the normal position. FIG. 12 is a right side view of the utility vehicle 201's rear of FIG. 11 with the loading bed in the dumping position. Elements identical to those of Embodiment 1 are denoted by the same reference signs and will not be described again. As shown in FIGS. 11 and 12, the utility vehicle 201 includes a single row of occupant seats disposed in an occupant space surrounded by a cabin frame portion 223. An intake unit 210 is disposed rearward of, and fixed to, the cabin frame portion 223. The intake unit 210 is located forward of the center of a loading bed 209 in the front-rear direction and rearward of the front end of the loading bed 209.

The intake unit 210 extends over a height range overlapping a height range over which the loading bed 209 in the normal position extends, and the location of the intake unit 210 in the vehicle width direction substantially coincides with the location of a right side wall 233 of the loading bed 209 in the vehicle width direction. The intake unit 210 located rearward of the cabin frame portion 223 is exposed to the outside in the vehicle width direction at a distance from a trajectory along which the loading bed 209 is tilted. The intake unit 210 includes a unit main body 241, and the unit main body 241 is not provided with any element corresponding to the projecting wall portion 41b of Embodiment 1. The unit main body 241 has an intake port 241a facing outward in the vehicle width direction and covered by a prefilter 242.

The right side wall 233 of the loading bed 209 includes a side wall main body 233a, and the side wall main body 233a includes an outer side surface 233aa and a recessed portion 233ab formed in the shape of a step by recessing the outer side surface 233aa inwardly in the vehicle width direction. This recessed portion 233ab is at a location corresponding to the location of the intake unit 110. The recessed portion 233ab is open forward and downward. The intake unit 210 as viewed from the outside in the vehicle width direction is disposed such that the gap G is formed between the intake unit 210 and the periphery of the recessed portion 233ab of the loading bed 209 in the normal position. That surface of the recessed portion 233ab of the loading bed 209 which faces outward in the vehicle width direction is a hiding surface 233ac covering the gap G from the inside in the vehicle width direction.

A side cover 208 is disposed rearward of the cabin frame portion 223, forward of the rear wheels 3, and below the loading bed 209. The air cleaner box 13 is disposed inwardly of a separable cover 208b of the side cover 208 in the vehicle width direction. When a locking device 208c is released and the separable cover 208b is removed from a cover main body 208a, the air cleaner box 13 is exposed to the outside in the vehicle width direction. In the present embodiment, the air cleaner box 13 is located rearward of the cabin frame portion 223, forward of the rear wheels 3, and directly below the intake unit 210.

In the above configuration, the occupant space surrounded by the cabin frame portion 223 can be sufficiently large, and at the same time clean air can be reliably drawn through the intake port 241a of the intake unit 210 from air stream flowing along a lateral side of the vehicle 201 during travel. Further, constraints on the movement of the loading bed 209 can be avoided, and at the same time the design flexibility of the intake passage can be increased. The other elements are the same as those of Embodiment 1 previously described and will therefore not be described again.

Embodiment 4

Figure 13:
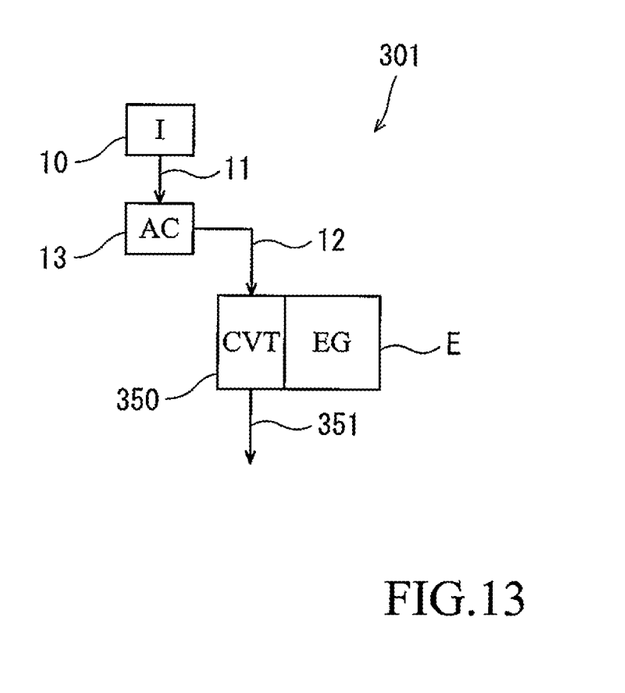
FIG. 13 is a block diagram of an intake system of a utility vehicle according to Embodiment 4.

FIG. 13 is a block diagram of an intake system of a utility vehicle 301 according to Embodiment 4. As shown in FIG. 13, the utility vehicle 301 includes a belt continuously variable transmission 350 configured to change the speed of rotation produced by rotational power output from the engine E and transmit the resulting rotation to the drive wheels. The continuously variable transmission 350 includes a housing, in which a drive pulley, a driven pulley, and a belt are accommodated. The belt is cooled with air because overheating of the belt reduces the service life of the belt. Specifically, an impeller rotatable together with the pulleys is mounted in the housing of the continuously variable transmission 350, air is drawn into the housing from the outside by the effect of the rotation of the impeller to cool the belt, and the air is discharged to the outside after cooling the belt.

In the present embodiment, the intake unit 10 previously described is used in an intake passage for cooling of the belt of the continuously variable transmission 350. When the continuously variable transmission 350 is in operation, the above-mentioned impeller rotates to generate negative pressure, under the action of which the intake unit 10 draws air from the outside in the vehicle width direction. The air is delivered from the intake unit 10 to the air cleaner box 13 through the first intake duct 11. The air purified by the air cleaner box 13 is delivered to an intake port of the housing of the continuously variable transmission 350 through the second intake duct 12. The air having cooled the belt in the housing is discharged to the outside through an exhaust duct 351. The detailed configurations of the intake unit 10 and the related neighboring structure are the same as those in any of Embodiments 1 to 3 and will therefore not be described again.

While in Embodiment 4 only the passage for cooling of the continuously variable transmission 350 has been described, the intake units 10 may be provided in pair, and the intake units 10 draw air and deliver the drawn air to the engine E and to the continuously variable transmission 350, respectively. In the case where the utility vehicle is equipped with an electric motor serving as a prime mover instead of the engine E, the intake unit 10, 110, or 210 described above may be used in a passage for cooling of the electric motor.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

The invention claimed is:

1. A utility vehicle comprising:
   a front wheel;
   a rear wheel;
   a vehicle body frame supported by the front wheel and the rear wheel, the vehicle body frame comprising a cabin frame portion defining an occupant space and a rear frame portion disposed rearward of the cabin frame portion;
   an engine supported by the vehicle body frame;
   a loading bed supported by the rear frame portion and tiltable between a normal position and a dumping position; and
   an intake unit comprising an intake port through which air to be supplied to the engine is drawn, wherein
   the intake unit is disposed above the rear wheel and extends over a height range overlapping a height range over which the loading bed in the normal position extends,
   a location of the intake unit in a vehicle width direction substantially coincides with a location of a side wall portion of the loading bed in the vehicle width direction,
   the intake unit is located rearward of the cabin frame portion and exposed to the outside in the vehicle width direction, the intake unit is fixed to the vehicle body frame at a distance from a trajectory along which the loading bed is tilted, and the loading bed comprises a right side wall and a left side wall, and the right side wall and the left side wall are asymmetrical in shape such that one of the right side wall and the left side wall forms a space in which the intake unit is located.

2. The utility vehicle according to claim 1, wherein the intake unit has an outer side surface facing outward in the vehicle width direction, and the outer side surface of the intake unit is substantially flush with an outer side surface of the loading bed in the normal position.

3. The utility vehicle according to claim 1, wherein the intake unit is disposed along a rear surface of the cabin frame portion.

4. The utility vehicle according to claim 1, wherein a tilt pivot of the loading bed is located at a height equal to or less than a height where a lower end of a rear surface of the intake unit is located.

5. The utility vehicle according to claim 1, wherein the intake unit as viewed from the outside in the vehicle width direction is located within a height range between heights where lower and upper ends of the loading bed in the normal position are located, respectively.

6. The utility vehicle according to claim 1, wherein
the intake unit as viewed from the outside in the vehicle width direction is disposed such that a gap is formed between the intake unit and the loading bed in the normal position, and
the loading bed or the intake unit has a hiding surface covering the gap from the inside in the vehicle width direction.

7. The utility vehicle according to claim 1, further comprising an air cleaner box disposed in an intake passage leading from the intake unit to the engine, the air cleaner box comprising an accommodation case having an opening, an air cleaner element accommodated in the accommodation case, and a lid attached to the accommodation case to close the opening, wherein
the intake unit comprises a prefilter covering the intake port, and
the air cleaner box is located below the intake unit.

8. The utility vehicle according to claim 7, wherein
the prefilter is removably attached to an outer surface of the intake unit,
the opening faces outward in the vehicle width direction, and
the lid is removably attached to the accommodation case from the outside in the vehicle width direction.

9. The utility vehicle according to claim 1, wherein
an outer surface of the intake unit in the vehicle width direction is exposed to the outside in the vehicle width direction, and
the intake port of the intake unit faces in a direction different from a direction toward the outside in the vehicle width direction.

10. The utility vehicle according to claim 1, wherein the intake port of the intake unit faces outward in the vehicle width direction.

11. A utility vehicle comprising:
a front wheel;
a rear wheel;
a vehicle body frame supported by the front wheel and the rear wheel, the vehicle body frame comprising a cabin frame portion defining an occupant space and a rear frame portion disposed rearward of the cabin frame portion;
a prime mover supported by the vehicle body frame and configured as an internal combustion engine or an electric motor;
a continuously variable transmission configured to change the speed of rotation produced by drive power output from the prime mover;
a loading bed supported by the rear frame portion and tiltable between a normal position and a dumping position; and
an intake unit comprising an intake port through which air to be supplied to the continuously variable transmission or the prime mover is drawn, wherein
the intake unit is disposed above the rear wheel and extends over a height range overlapping a height range over which the loading bed in the normal position extends,
a location of the intake unit in a vehicle width direction substantially coincides with a location of a side wall portion of the loading bed in the vehicle width direction,
the intake unit is located rearward of the cabin frame portion,
the intake unit is fixed to the vehicle body frame at a distance from a trajectory along which the loading bed is tilted, and
the loading bed comprises a right side wall and a left side wall, and the right side wall and the left side wall are asymmetrical in shape such that one of the right side wall and the left side wall forms a space in which the intake unit is located.

12. The utility vehicle according to claim 1, wherein the one of the right side wall and the left side wall includes a recessed portion that forms the space in which the intake unit is located.

13. The utility vehicle according to claim 1, wherein
a front end of the one of the right side wall and the left side wall is located further rearward than a front end of the other of the right side wall and the left side wall, and
the intake unit is disposed ahead of the one of the right side wall and the left side wall.

14. The utility vehicle according to claim 1, wherein the engine is disposed below the loading bed.

15. The utility vehicle according to claim 11, wherein the one of the right side wall and the left side wall includes a recessed portion that forms the space in which the intake unit is located.

16. The utility vehicle according to claim 11, wherein
a front end of the one of the right side wall and the left side wall is located further rearward than a front end of the other of the right side wall and the left side wall, and
the intake unit is disposed ahead of the one of the right side wall and the left side wall.

17. The utility vehicle according to claim 11, wherein the prime mover is disposed below the loading bed.

* * * * *